United States Patent [19]

Bentley et al.

[11] Patent Number: 4,781,283
[45] Date of Patent: Nov. 1, 1988

[54] ACCUMULATION CONVEYORS

[75] Inventors: David P. Bentley, Gainsborough; Victor E. Dolling, Laughterton, both of England

[73] Assignee: Dexion-Comino International Limited, Hempstead, England

[21] Appl. No.: 13,156

[22] Filed: Feb. 10, 1987

Related U.S. Application Data

[63] Continuation of Ser. No. 711,937, Mar. 15, 1985, abandoned.

[30] Foreign Application Priority Data

Mar. 16, 1984 [GB] United Kingdom ............... 8406923

[51] Int. Cl.⁴ .......................................... B65G 47/26
[52] U.S. Cl. ..................... 198/460; 198/781
[58] Field of Search ............. 198/460, 781, 789

[56] References Cited

U.S. PATENT DOCUMENTS

| | | |
|---|---|---|
| 3,327,837 | 6/1967 | Covell ................................ 198/781 |
| 3,537,568 | 11/1970 | Leach ................................ 198/781 |
| 4,063,636 | 12/1977 | Von Stein ......................... 198/781 |
| 4,121,709 | 10/1978 | Beghardt .......................... 198/781 |
| 4,172,519 | 10/1979 | Leach ................................ 198/781 |
| 4,215,775 | 8/1980 | Gebhardt et al. .................. 198/781 |
| 4,488,638 | 12/1984 | Morgan et al. .................... 198/781 |
| 4,605,120 | 8/1986 | Vanderlinde et al. ............. 198/781 |

FOREIGN PATENT DOCUMENTS

| | | | |
|---|---|---|---|
| 34131 | 8/1981 | European Pat. Off. ............ | 198/781 |
| 3222028 | 1/1983 | Fed. Rep. of Germany ...... | 198/781 |
| 2048812 | 12/1980 | United Kingdom ............... | 198/781 |

Primary Examiner—Robert J. Spar
Assistant Examiner—D. Glenn Dayoan
Attorney, Agent, or Firm—Pollock, Vande Sande and Priddy

[57] ABSTRACT

In an accumulation conveyor comprising load-carrying rollers, a roller drive is so devised that all rollers under one and the same load at a time are either being positively driven by, or are disengaged from, the said drive. Mechanism controlling engagement of the drive comprises a combination of a clutch-actuating linkage and a priming linkage which prepares the actuating linkage for operation. The mechanism may be positively actuable by a return spring of a sensor device, for example a roller depressable by a load. An assembly of load-carrying rollers may have sprockets drivable by a standard-width chain movable in a constant line. The mechanism may include a transversely movable dogclutch part which forms part of a continuously rotating sprocket assembly engageable with and disengageable from a load-carrying roller, the said clutch part passing through an opening in the sprocket so that the positive drive is picked-up and positively transmitted to the roller.

3 Claims, 7 Drawing Sheets

ACCUMULATION CONVEYORS

This application is a continuation of application Ser. No. 711,937 filed Mar. 15, 1985 now abandoned.

BACKGROUND OF THE INVENTION

This invention concerns improvements relating to accumulation conveyors, that is conveyors upon which a sequence of loads can be accumulated and, if need be, temporarily stored. It is particularly concerned with so-called pallet-accumulation conveyors, in which loads upon a sequence of pallets, possibly articulated, are accumulated and can be caused to be wholly or partially automatically and/or manually advanced continuously and/or intermittently upon a conveyor device, which may comprise a combination of conveyor elements.

It is an object of the invention to provide accumulation conveyors which could not only be produced with a simple construction and at limited expense, but also to offer advantages with respect to reliability.

SUMMARY OF THE INVENTION

With this object in mind, according to one aspect of the invention, an accumulation conveyor comprises load-carrying rollers and roller-driving means so arranged and/or controlled that all said rollers under one said load at any one time are either being positively driven or are disengaged from the said driving means.

Thus in this respect, in the case of a pallet accumulation conveyor, the roller-driving means may be so devised and/or controlled that such rollers under any one pallet are either being positively drawn or are disengaged from the said roller driving means.

This can be achieved by employing, inter alia, a combination of a 'priming' lever or linkage and an 'actuating' lever or linkage as hereinafter explained.

When for instance by disengaging of a dog-clutch, the drive is removed from the load-carrying or pallet-carrying rollers, there is to be no residual frictional drive or 'scuffing' of said rollers which would cause them to continue rotating. Thus pallet 'over-run' can be reduced and gaps, between pallets in the accumulation mode, can be maintained.

In accordance with a further, contributory, feature of the invention an engaging and disengaging mechanism of the clutch may be positively actuated by a return spring of a sensor device, for example a sensor roller depressable by a load or pallet present on the conveyor. No internal springs are required to be used at the end of load-carrying rollers.

According to a further feature of the invention, chain sprockets on roller assemblies are not required to move axially in the course of action for engaging and disengaging the drive means. A common driving chain may therefore be of standard width and move in a constant line, which also contributes to simplicity of construction and practical reliability in use.

As priming and actuating levers can be isolated from continuously rotating driving sprockets, no tendency for the levers to move under the influence of frictional contact with the sprockets need be produced.

It is a material advantage of the present invention that modular sections of conveyors in the accumulation zone can be fully assembled at a manufacturing source. The only on-site fitting that need then be provided is for the driving chain of the conveyor and for connecting priming and actuating linkages. Thus installation work and time can be materially reduced.

Conveyor-actuating mechanism or means may be in form of a rockable lever producing axial movement of the one half of a dog clutch, which rotates with a continuously rotating sprocket, to engage it with or disengage it from the coacting half of the clutch forming part of the conveyor roller. The movable part of the clutch may have elements, away from the dogs, which pass through apertures in the sprocket and can therefore pick up positive drive for transmission to the respective conveyor roller when in the engaged position.

With the actuating mechanism employed and with drive applied to all the rollers under a pallet, the weight range for pallets to be handled may extend from that of one unloaded pallet to that of pallets carrying a full load.

BRIEF DESCRIPTION OF THE DRAWINGS

A preferred embodiment of the invention as appied to a pallet accumulation conveyor will now be more fully described by way of example with reference to the accompanying drawings, in which:

In FIGS. 1, and 4 to 6 the direction of conveyor travel is indicated at D.

FIGS. 8 $a,b,c$ and $d$ are respetively a side view, end view, plan and an enlarged detail side view of serrations of a chain-guide housing.

DESCRIPTION OF THE PREFERRED EMBODIMENT

For a general understanding of a preferred conveyor, reference will be made firstly to FIGS. 1 to 3 of the drawings. In an accumulation zone of the conveyor, each load-conveying roller 1 has, at one end only, a clutch mechanism by which the roller can be controllably driven from a continuously running drive means, for example and as shown a chain 14 (FIG. 3) meshed with a sprocket 15 for each roller. Each roller 1 is rotatable about a stationary axle 2 secured by a bolt 3 (FIG. 3) at each end to a side channel 4 forming part of a supported conveyor framework. A sealed bearing 5 (FIG. 3) is housed at each end of the roller, the bearing at the driven end having dogs spaced symmetrically upon the exposed surface of the bearing housing. These can be seen as narrow-hatched parts 7 in FIG. 1. Pallets carried on the roller 1 may be kept in position by side wheel or flanges (not shown) depending upon the type of pallet used.

Figure 2:
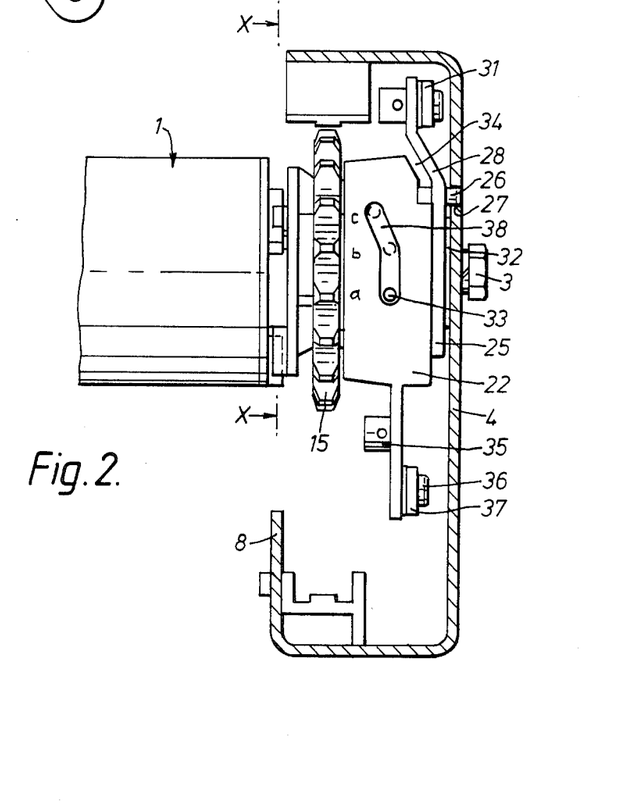
FIG. 2 is a side view of the mechanism in position at one end of a conveyor roller shown in the driving mode.
Figure 3:
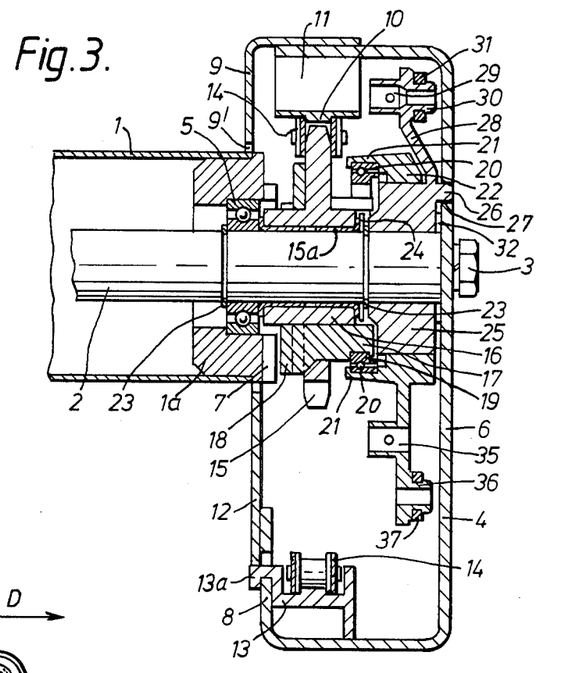
FIG. 3 is a view in the same direction as FIG. 2, but partly in section, showing the mechanism in its non-drive mode.

As will be evident from FIGS. 2 and 3 of the drawings, each of the rollers 1 comprises a cylindrical load-supporting surface part on end bodies 1a (one seen in the FIGS.) that are rotatably mounted by sealed ball bearings 5 on a stationary axle 2 fixed in the upright part of a C or U-section side channel 4 having an upturned flange 8. Driving and clutch mechanisms, hereinafter described, for each roller 1 are located within the channel 4 and, for safety, the open side of the channel is closed by a scalloped guard in two parts (FIG. 3). The upper guard part 9 is cut away at 9' at roller-center intervals to clear the tops of the rollers 1 and is held in place by being fixed onto the top of the channel at between-roller intervals. The upper guard part 9 encloses driving chain 14, chain-guide housing 11 and an adjustable chain-guide shoe 10, the upper guard part permitting access for accurate setting of the dimension between the center line of the roller axle 2 and the top of the chain-roller path, and access for securing screws holding chain-guide housing 11 and chain-guide shoe 10 in place. The chain-guide housing 11 and shoe 10 are shown in FIGS. 8a to 8d and FIGS. 9a to 9d respectively. Means of adjustment comprising serrated-edge wedges clampable together in adjusted position can be seen in FIGS. 8a to 9a.

The lower scalloped guard part 12 (FIG. 3) overlaps the upturned flange 8 of the side channel 4 and has a circular cut-out to clear the lower half of each conveying roller 1. The said lower guard part is secured by a fixing to the upturned flange 8 and rests upon a return-chain-guide 13. The upturned flange of the channel is slotted at intervals to allow passage of a lip 13a of the chain guide 13 to rest at the bottom of the slot, whereby the chain guide is held in place.

The chain sprocket 15 has teeth of conventional type. In the face of the sprocket 15 apertures are symmetrically positioned to accommodate fins 17 of the movable half 18 of the dog clutch. An aperture with a fin in position is shown in FIG. 3.

Figure 1:
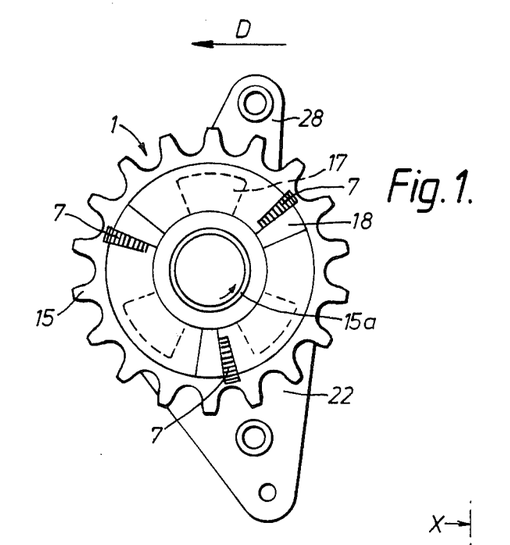
FIG. 1 is a vertical section taken on the line X—X in FIG. 2 and showing a clutch mechanism in the driving mode as hereinafter described.

The position of the fins 17 and engaging dogs 18 are shown in FIG. 1 and in FIG. 3.

That portion of each sprocket through which the axle 2 passes is bushed, as shown at 15a in FIG. 1 and 3. Circlips 23 adjacent to bearing 5 and washer 24 prevent relative axial movement of roller assembly 1 and sprocket 15.

All parts of the mechanism except the sealed bearing 5, axle 2 and the roller 1 may be of plastics material.

The sprocket 15 is freely rotatable around the axle 2 and, in movement, carries with it the movable part of the dog clutch. The engaging end of the latter has symmetrically placed dogs 18 which, in the engaged position, mesh with the dogs 7 on the exposed surface of the bearing housing in the roller 1. The engaged position of the movable clutch part 18 and the dogs 7 is shown in FIG. 1. The end of the movable clutch part away from the dogs consists of fins 17 which are lipped at the ends and grooved to accommodate part of the inner ring 19 of a bearing having a small ball race 20 (FIG. 3). The outer perimeter of this bearing is gripped by claws 21 projecting from and disposed about the hub perimeter of the actuating lever 22.

Figure 4:
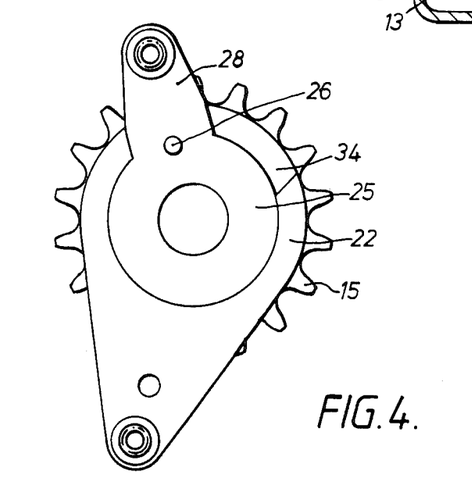
FIG. 4 is a view in the axial direction opposite to FIG. 1.

At the extreme end of the roller axle 2 is a priming lever 25 rotatable about the axle but limited in movement to an arc of about 30° by means of an integral peg 26 whic protrudes from the body of that lever and locates in a slot 27 in the channel 4. The position of this peg is shown in FIG. 4 and its engagement in the channel is shown in FIG. 3.

The upper part of the priming lever 25 is an offset arm 28 at the end of which is a means 29 for clamping a cable on the side towards the sprocket 15 and a spindle 30 for link bar 31 on the other side. A thrust washer 32 (FIG. 3) between the side channel 4 and the priming lever 25 and circlips 23 retain the position of the priming lever 25 in relation to the roller axle 2, preventing relative axial movement.

At diametrically opposite positions on the periphery of the main boss of the priming lever 25 are two integral pegs 33 which move through an arc of 30° when the priming lever is moved by operation of the priming-link bar 31.

Figure 5:
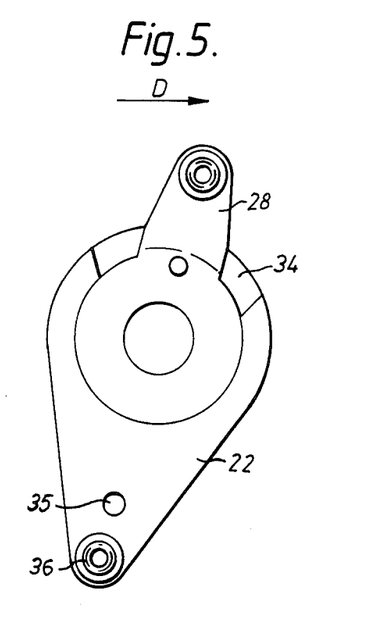
FIG. 5 is a view in the axial direction opposite to FIG. 1 showing the mechanism in its primed position.

Surrounding the hub of the priming lever 25 is the hub of actuating lever 22 (FIG. 3) which is free to move both rotatably and axially. On the face adjacent to the sprocket 15 are the claws 21 securing the thrust bearing 20 and at the upper end of the face, away from the sprocket, is an inclined recess 34 (FIG. 5) in which the offset arm 28 of the priming lever is movable through 30°. The lower portion of the actuating lever 22 has a cable clamp 35 and means 36 (FIG. 2) securing an actuating bar 37. Two slots 38 on opposite sides of the hub body of the actuating lever 22 each have a straight portion a-b and an offset portion b-c. The slots 38 are engaged by pegs 33 projecting from the priming lever 25. By movement of either the priming lever 25 or the actuating lever 22 the pegs can be caused to take up related positions a, b and c in the slots 38 (FIG. 2).

Figure 6:
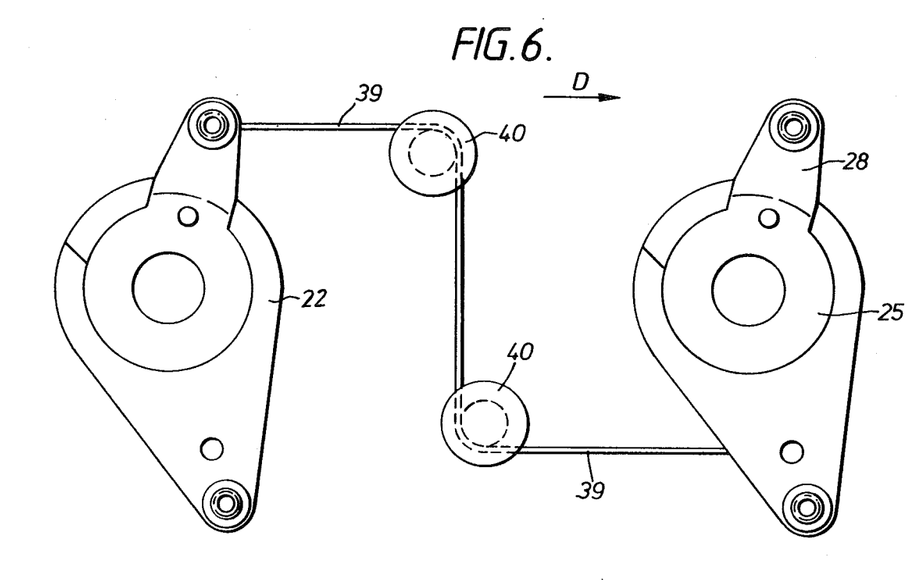
FIG. 6 is a view, in the axial direction opposite to FIG. 1, showing two coupled mechanisms in the non-drive position and, FIGS. 7A and 7B together are a schematic representation of the mechanism for stages A to I of an operating sequence of a conveyor.

Connecting each priming lever 25, with its priming bar 31, to the actuating lever 22, with its bar 37, of an adjacent roller assembly is a cable 39 (FIG. 6) passing over two pulleys 40, whose spindles are secured in the side channels 4 between each group of priming and actuating levers. A further pulley, not seen in FIG. 6 carries a cable 39a connected at one end to a sensor lever 41 and at the other end to the end of the actuating bar of the adjacent assembly (see FIG. 7 for operation stage A).

Alternatively, a combination of a sliding flexible inner cable witnn a fixed outer sheath may be used to connect priming and actuating lever sets.

A means is provided, for example a spring, to assist the return of the sensor lever 41 to a non-operating position. Both the priming bar and the actuating bar are provided with a means of assisting their return to a drive or primed mode (FIGS. 7A and 7B).

As will be appreciated, frictional losses are kept to a minimum and also such little force as is required to move the parts of the mechanism through the sequential modes of drive, prime and accumulate.

Figure 7A:
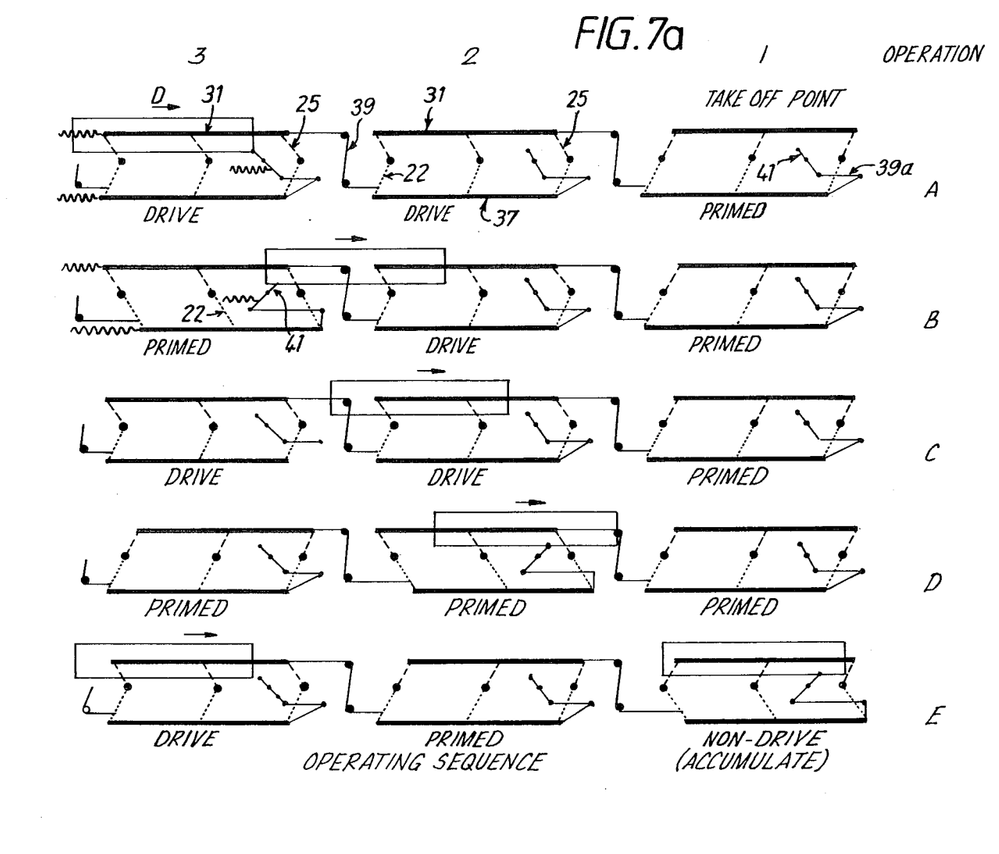
Figure 7B:
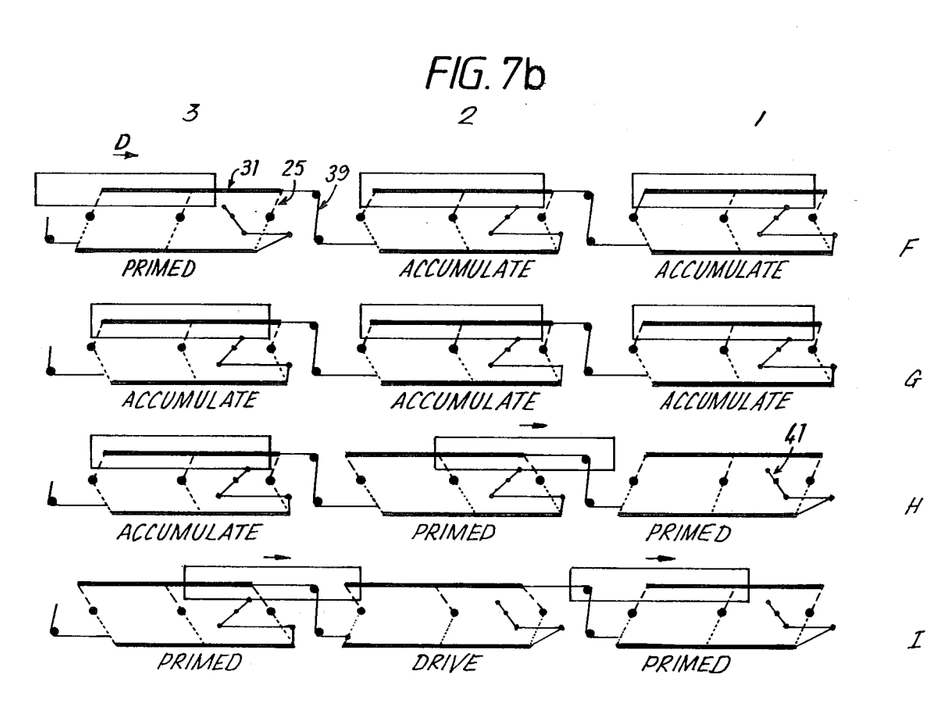
Figure 8A:
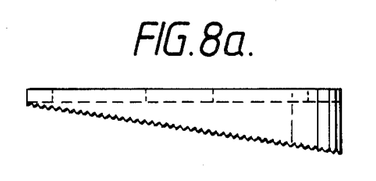
Figure 8B:
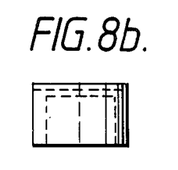
Figure 8C:
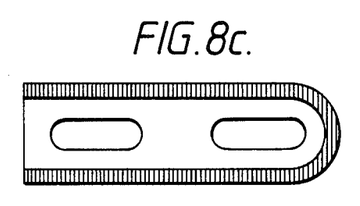
Figure 8D:
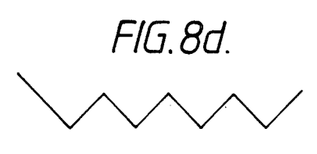
Figure 9A:
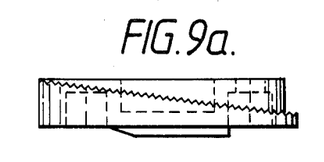
FIGS. 9a to 9d are views corresponding to FIGS. 8a to 8d of a chain guide shoe.
Figure 9B:
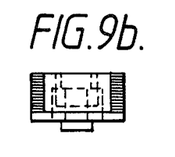
Figure 9C:
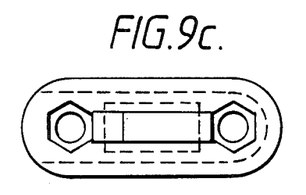
Figure 9D:
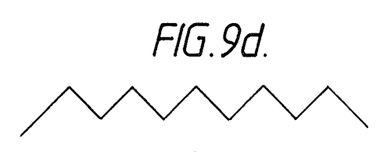

The manner of operation may be better understood by reference to the diagram in FIGS. 7A and 7B which represents, at a sequence of stages A to I, three groups of accumulating sections 1 to 3 immediately before a point in the conveyor line where a pallet is removed or transferred. The priming and actuating levers are represented by distinctive lines, only three being shown in each section for simplicity.

(A) All section are in "Drive" except that at the take-off point 1, which is set at "Primed", by a fixed permanent position of the priming levers 25, there being no cable attachment to the priming link bar. The actuating levers 22 at this take-off point move only when depression or movement, of the sensor lever 41, causes the actuating levers 22 to move into the accumulating or non-drive mode.

(B) A pallet moves over position 3, and, by means of the sensor lever 41, causes the actuating levers 22 to move into a primed mode. The peg 33 on the priming lever 25 will now be at the central position b in the slot 38. The clutch is still engaged and therefore the pallet continues to move into position 2.

(C) Upon release of the sensor lever 41 in position 3 the actuating levers 22 move back into the Drive mode with the assistance of spring or other means.

(D) The pallet moving over the sensor lever 41 in section 2 produces a primed mode in that section and at the same time the movement of the actuating bar acts on the cable 39 to move section 3 into a Primed mode as well.

(E) The pallet on reaching section 1 brings the section into non-drive, simultaneously producing a primed state in section 2; section 3 reverts to a drive mode.

(F) A second pallet moves into section 2 and on contact with the sensor lever 41 moves the actuating levers 22 into accumulation.

(G) A third pallet produces an accumulated stage in section 3. The sequence is repeated down the conveyor.

(H) This shows what happens when the pallet in section 1 is removed. Upon release of the sensor lever 41, the section becomes primed and simultaneously the priming levers 1 of section 2 move back into Primed, due to release of tension of the cable connection and the influence of the return spring (or other return means) attached to the priming link bar of section 2. Thus a pallet in section 2 moves forward into section 1.

(I) As the pallet leaves section 2 the section moves into Drive, then Primed (as section 1 becomes 'Accumulate') and subsequently 'Accumulate'. The positions of all three sections become as shown in stage F.

With drive applied to all rollers under a pallet, it is possible to handle a greater weight range of pallets than is possible on other pallet accumulation systems, for example, from a single empty pallet up to pallets weighing 1.5 tons.

What is claimed is:

1. An accumulation conveyor comprising:
   a plurality of zones of load carrying rollers;
   a common drive means which can be selectively applied to all of the load carrying rollers in each of said zones;
   each of said zones including a single load sensor roller that is unique to said zone;
   each of said load carrying rollers including a clutch which is unique to that load carrying roller for selectively applying drive from said drive means to said load carrying roller, each said clutch including a clutch actuating lever which is unique to said clutch, a priming lever which is unique to said clutch and which primes said clutch for operation, a first linkage which mechanically connects all of the priming levers in a given zone to the actuating levers of the clutches for the load carrying rollers in the next adjacent downstream zone, and a second linkage which mechanically connects all of the actuating levers in said given zone to the load sensor roller that is associated with the given zone in which said load carrying rollers are located;
   the priming and actuating levers associated with each of said clutches being so arranged relative to one another and relative to said clutch that movement of both the priming lever and the actuating lever associated with said clutch is required to effect disengagement of said clutch to remove said drive from the load carrying roller associated with said clutch, each of said clutches having means for rendering movement of its associated clutch actuating lever ineffective unless the priming lever associated with said clutch has been moved into a predetermined priming position relative to the actuating lever associated with said clutch;
   said drive means, clutches, actuating levers, priming levers, load sensor rollers and linkages in each of said zones and in adjacent ones of said zones cooperating with one another to cause all of the load carrying rollers in a particular one of said zones to be simultaneously positively driven by said drive means to transport a load through said particular zone or, alternatively, when the sensor roller in a zone downstream of said particular zone detects that said downstream zone is occupied by a load, to cause all of the load carrying rollers in said particular zone to be simultaneously disengaged from said drive means by the load itself in said particular zone acting upon the load sensor roller in said particular zone.

2. The conveyor of claim 1 wherein said common drive means includes a sprocket adjacent each said clutch which is continuously driven by a chain movable along a constant line.

3. The conveyor of claim 2 wherein each of said clutches comprises an axially movable element which rotates with and constitutes part of a continuously rotating sprocket assembly for said clutch, said axially movable element being engageable with an disengageable from mating dogs forming part of the load carrying roller associated with said clutch, said movable element extending through at least one opening in said sprocket assembly to effect positive drive from the said sprocket assembly to the load carrying roller with which said clutch is associated or to disconnect the drive from said load carrying roller in dependence on the relative positions of the priming lever and the actuating lever associated with said clutch.

* * * * *